United States Patent
Fukushi et al.

(10) Patent No.: US 6,773,755 B2
(45) Date of Patent: Aug. 10, 2004

(54) PROCESS FOR PREPARING A MULTI-LAYER ARTICLE HAVING A FLUOROPLASTIC LAYER AND AN ELASTOMER LAYER

(75) Inventors: Tatsuo Fukushi, Woodbury, MN (US); Robert E. Kolb, Afton, MN (US); Craig R. Hoff, Champlin, MN (US); Steven J. Wellner, Afton, MN (US); Attila Molnar, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 09/980,749
(22) PCT Filed: Aug. 8, 2001
(86) PCT No.: PCT/US01/24867
§ 371 (c)(1), (2), (4) Date: Nov. 15, 2001
(87) PCT Pub. No.: WO02/16112
PCT Pub. Date: Feb. 28, 2002

(65) Prior Publication Data
US 2003/0113464 A1 Jun. 19, 2003

(51) Int. Cl.$^7$ .............................. B05D 1/38; B05D 3/02
(52) U.S. Cl. ................. 427/379; 427/385.5; 427/407.1
(58) Field of Search .............................. 427/379, 385.5, 427/407.1

(56) References Cited

U.S. PATENT DOCUMENTS

| | | | |
|---|---|---|---|
| 4,287,322 A | 9/1981 | Worm | 525/403 |
| 4,338,237 A | 7/1982 | Sulzbach et al. | 524/777 |

(List continued on next page.)

FOREIGN PATENT DOCUMENTS

| | | |
|---|---|---|
| EP | 0 185 590 | 6/1986 |
| EP | 0 523 644 | 1/1993 |
| EP | 0 551 094 | 7/1993 |
| JP | 63-246224 | * 10/1988 |
| JP | 06-226810 | 8/1994 |
| JP | 08-258212 | 10/1996 |
| WO | WO 96/00657 | 1/1996 |
| WO | WO 98/08879 | 3/1998 |
| WO | WO 99/32557 | * 7/1999 |
| WO | WO 00/59706 | * 10/2000 |

OTHER PUBLICATIONS

F. W. Billmeyer, *Textbook of Polymer Science*, 3d ed., pp. 398–403, John Wiley & Sons, New York (1984).

(List continued on next page.)

*Primary Examiner*—Erma Cameron
(74) *Attorney, Agent, or Firm*—James V. Lilly; Brian E. Szymanski

(57) ABSTRACT

A method for enhancing the bond strength between a VDF-containing fluoroplastic layer and an elastomer layer of a multi-layer article. A VDF-containing fluoroplastic composition is applied to the surface of a precursor article that includes a curable elastomer layer to form a fluoroplastic layer. Prior to application of the fluoroplastic composition, the curable elastomer layer is thermally insulated to prevent it from undergoing substantial heating. Following application, the fluoroplastic layer is heated and the curable elastomer layer is cured (e.g., thermally cured). Preferably, the elastomer cure occurs separately from and subsequent to heating the fluoroplastic layer. The combination of thermally insulating the curable elastomer layer prior to application of the fluoroplastic composition and heating the fluoroplastic layer following application of the fluoroplastic composition results in formation of a strong bond between the fluoroplastic and elastomer layers upon cure.

29 Claims, 1 Drawing Sheet

U.S. PATENT DOCUMENTS

| | | | |
|---|---|---|---|
| 4,895,744 A | 1/1990 | Briggs et al. | 428/35.7 |
| 4,933,060 A | 6/1990 | Prohaska et al. | 204/192.36 |
| 5,170,011 A | 12/1992 | Martucci | 174/47 |
| 5,320,888 A | 6/1994 | Stevens | 428/36.2 |
| 5,427,831 A | 6/1995 | Stevens | 428/36.2 |
| 5,512,225 A | 4/1996 | Fukushi | 264/127 |
| 5,539,070 A | 7/1996 | Zharov et al. | 526/198 |
| 5,552,199 A | 9/1996 | Blong et al. | 428/36.9 |
| 5,588,469 A | 12/1996 | Kakiuchi et al. | 138/137 |
| 5,639,528 A | 6/1997 | Feit et al. | 428/36.91 |
| 5,641,445 A | 6/1997 | Fauble et al. | 264/171.24 |
| 5,658,670 A | 8/1997 | Fukushi et al. | 428/421 |
| 5,658,671 A | 8/1997 | Fukushi | 428/421 |
| 5,759,329 A | 6/1998 | Krause et al. | 156/244.13 |
| 5,827,587 A * | 10/1998 | Fukushi | 428/36.6 |
| 5,855,977 A * | 1/1999 | Fukushi et al. | 428/36.6 |
| 5,941,286 A | 8/1999 | Fauble et al. | 138/137 |

OTHER PUBLICATIONS

R. A. Brullo, "Fluoroelastomer Rubber for Automotive Applications", *Automotive Elastomer & Design*, 1985.

R. A. Brullo, "Fluoroelastomer Seal Up Automotive Future", *Materials Engineering*, Oct. 1988.

W. M. Grootaert et al., "Fluorocarbon Elastomers", Kirk–Othmer, *Encyclopedia of Chemical Technology*, vol. 8, pp 990–1005 ($4^{th}$ ed., John Wiley & Sons, 1993).

D. M. Brewis et al., *J. Adhesion*, vol. 41, pp. 113–128 (1993).

* cited by examiner

US 6,773,755 B2

PROCESS FOR PREPARING A MULTI-LAYER ARTICLE HAVING A FLUOROPLASTIC LAYER AND AN ELASTOMER LAYER

This application is the national stage of international application PCT/US01/24867 filed Aug. 8, 2001.

TECHNICAL FIELD

This invention relates to preparing multi-layer articles having a fluoroplastic layer and an elastomer layer.

BACKGROUND

Fluorine-containing polymers (also known as "fluoropolymers") are a commercially useful class of materials. Fluoropolymers include, for example, crosslinked fluoroelastomers and semi-crystalline or glassy fluoroplastics. Fluoroplastics are generally of high thermal stability and are particularly useful at high temperatures. They may also exhibit extreme toughness and flexibility at very low temperatures. Many of these fluoroplastics are almost totally insoluble in a wide variety of solvents and are generally chemically resistant. Some have extremely low dielectric loss and high dielectric strength, and may have unique non-adhesive and low friction properties. See, e.g., F. W. Billmeyer, *Textbook of Polymer Science*, 3d ed., pp. 398–403, John Wiley & Sons, New York (1984).

Fluoroelastomers, particularly the copolymers of vinylidene fluoride with other ethylenically unsaturated halogenated monomers such as hexafluoropropylene, have particular utility in high temperature applications such as seals, gaskets, and linings. See, e.g., R. A. Brullo, "Fluoroelastomer Rubber for Automotive Applications," *Automotive Elastomer & Design*, June 1985; "Fluoroelastomer Seal Up Automotive Future," *Materials Engineering*, October 1988; and W. M. Grootaert et al., "Fluorocarbon Elastomers," Kirk-Othmer, *Encyclopedia of Chemical Technology*, vol. 8, pp. 990–1005 ($4^{th}$ ed., John Wiley & Sons, 1993).

Multi-layer constructions containing a fluoropolymer enjoy wide industrial application. Such constructions find utility, for example, in fuel line hoses and related containers and hoses or gaskets in the chemical processing field. Increased concerns with evaporative fuel standards give rise to a need for fuel system components that have increased barrier properties to minimize the permeation of fuel or fuel vapors through automotive components such as fuel filler lines, fuel supply lines, fuel tanks, and other components of the engine's fuel or vapor recovery systems. Various types of tubing have been proposed to address these concerns.

Adhesion between the layers of a multi-layered article may need to meet various performance standards depending on the use of the finished article. However, it is often difficult to establish high bond strengths when one of the layers is a fluoropolymer. Various methods have been proposed to address this problem. One approach is to use an adhesive layer or tie layer between the fluoropolymer layer and the second polymer layer. Surface treatments for the fluoropolymer layer, including solvent etching and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself.

SUMMARY

The invention relates to a method for enhancing the bond strength between a fluoroplastic layer and an elastomer layer of a multi-layer article. The elastomer may be a fluoroelastomer or a non-fluorinated elastomer. According to the method, a fluoroplastic composition that includes interpolymerized units derived from vinylidene fluoride (VDF) is applied to the surface of a precursor article that includes a curable elastomer layer, preferably by extrusion coating the composition in molten form through a crosshead die, to form a fluoroplastic layer. Preferably, the composition is applied directly to the surface of the elastomer layer. Prior to application of the fluoroplastic composition, the curable elastomer layer is thermally insulated to prevent it from undergoing substantial heating. In one embodiment, where molten fluoroplastic composition is extrusion coated through a crosshead die, thermal insulation is achieved by equipping the die with a sleeve located at least partially within the upstream end of the die that receives and thermally insulates the curable elastomer layer prior to application of the fluoroplastic composition.

Following application, the fluoroplastic layer is heated and the curable elastomer layer is cured (preferably thermally cured). Preferably, the elastomer cure occurs separately from and subsequent to heating of the fluoroplastic layer. The combination of thermally insulating the curable elastomer layer prior to application of the fluoroplastic composition and heating the fluoroplastic layer following application of the fluoroplastic composition results in formation of a strong bond between the fluoroplastic and elastomer layers upon cure, even in the absence of adhesion aids such as surface treatments, separate adhesive layers, and the like. For example, bond strengths of at least 15 N/cm, can be achieved.

Multi-layer articles prepared according to this method can be provided in a wide variety of shapes, including sheets, films, containers, hoses, tubes, and the like. The articles are especially useful wherever chemical resistance and/or barrier properties are necessary. Examples of specific uses for the articles include their use in rigid and flexible retroreflective sheets, adhesive articles such as adhesive tapes, paint replacement films, drag reduction films, fuel line and filler neck hoses, exhaust handling hoses, fuel tanks, and the like. The articles are also useful in chemical handling and processing applications, and as wire and cable coatings or jackets.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
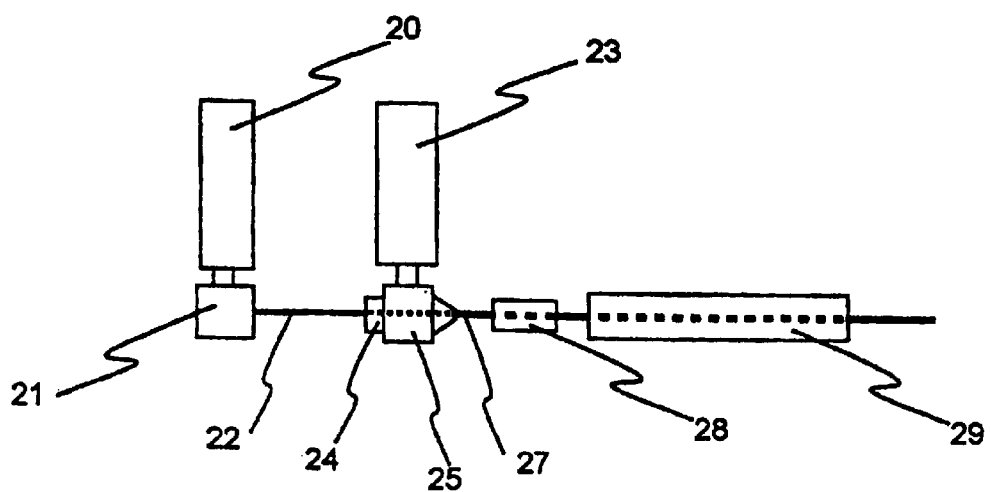
FIG. 1 is a schematic drawing of a process for making a multi-layered article according to the invention.

Referring to FIG. 1, there is shown one embodiment of a process for preparing a multi-layer article featuring a fluoroplastic layer bonded to an elastomer layer. An extruder 20 extrudes a curable elastomer composition through a die 21 to form a length of tubing 22 having a curable elastomer layer. A second extruder 23 located downstream of extruder 20 and equipped with a crosshead die 25 coats a layer of molten fluoroplastic onto the surface of the curable elastomer layer. A plastic (or other thermally insulating material) sleeve 24, e.g., a tetrafluoroethylene sleeve, inserted partially within the upstream opening of die 25 receives tubing 22 and thermally insulates it prior to extrusion coating, thereby preventing substantial heating of the curable elastomer layer prior to application of the fluoroplastic. The absence of substantial heating prior to application of the fluoroplastic contributes to the development, upon cure, of a strong bond between the fluoroplastic and elastomer layers. It may also be desirable to cool the curable elastomer prior to application of the fluoroplastic. This may be accomplished, for example, by treating the curable elastomer layer with a solvent that could then be removed by evaporation.

Following extrusion coating, the resulting multi-layer article 27, featuring a fluoroplastic layer deposited on a curable elastomer layer, enters a tubular heater 28 that heats the fluoroplastic layer. An example of a useful tubular heater is a radiant heater. During the heating process, heat is transferred from heater 28 to the fluoroplastic layer, and then transferred inwardly from the fluoroplastic layer to the curable elastomer layer. It is believed that this heating step contributes to the development, upon cure, of a strong bond between the fluoroplastic and elastomer layers. Following the heating operation, the multi-layer article may be cooled, e.g., by immersion in a cooling bath 29.

The elastomer layer may be cured either in heater 28, or, more preferably, in a separate step under pressure and higher temperature either before or after immersion in cooling bath 29. For example, it may be desirable to cool the article in bath 29, cut it into appropriately sized pieces, and then heat the individual pieces under pressure, e.g., in an autoclave, to cure the curable elastomer layer.

The fluoroplastic preferably is a material that is capable of being extrusion coated. Such fluoropolastics typically have melting temperatures ranging from about 100 to about 330° C., more preferably from about 150 to about 270° C. The fluoroplastic includes interpolymerized units derived from VDF and may further include interpolymerized units derived from other fluorine-containing monomers, non-fluorine-containing monomers, or a combination thereof. Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCH=CF_2$ and $CF_3CF_2CF_2OCF=CF_2$), and fluorine-containing di-olefins such as perfluorodiallylether and perfluoro-1,3-butadiene. Examples of suitable non-fluorine-containing monomers include olefin monomers such as ethylene, propylene, and the like.

The VDF-containing fluoroplastics may be prepared using emulsion polymerization techniques as described, e.g., in Sulzbach et al., U.S. Pat. No. 4,338,237, hereby incorporated by reference. Useful commercially available VDF-containing fluoroplastics include, for example, THV 200, THV 400, THV 500G, THV 610X fluoropolymers (available from Dyneon LLC, St. Paul, Minn.), KYNAR 740 fluoropolymer (available from Atochem North America, Philadelphia, Pa.), HYLAR 700 (available from Ausimont USA, Inc., Morristown, N.J.), and FLUOREL FC-2178 (available from Dyneon LLC).

A particularly useful fluoroplastic includes interpolymerized units derived from at least TFE and VDF in which the amount of VDF is at least 0.1% by weight, but less than 20% by weight. Preferably, the amount of VDF ranges from 3–15% by weight, more preferably from 10–15% by weight.

The curable elastomer may be a fluoroelastomer or a non-fluorinated elastomer. Examples of suitable fluoroelastomers include VDF-HFP copolymers, VDF-HFP-TFE terpolymers, TFE-propylene copolymers, and the like. Examples of suitable non-fluorinated elastomers include acrylonitrile butadiene (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Commercially available elastomers include Nipol™ 1052 NBR (Zeon Chemical, Louisville, Ky.), Hydrin™ C2000 epichlorohydrin-ethylene oxide rubber (Zeon Chemical, Louisville, Ky.), Hypalon™ 48 chlorosulfonated polyethylene rubber (E.I. DuPont de Nemours & Co., Wilmington, Del.), Nordel™ EPDM (R.T. Vanderbilt Co., Inc., Norwalk, Conn.), Vamac™ ethylene-acrylate elastomer (E.I. DuPont de Nemours & Co. Wilmington, Del.), Krynac™ NBR (Bayer Corp., Pittsburgh, Pa.), Perbunan™ NBR/PVC blend (Bayer Corp., Pittsburgh, Pa.), Therban™ hydrogenated NBR (Bayer Corp., Pittsburgh, Pa.), Zetpol™ hydrogenated NBR (Zeon Chemical, Louisville, Ky.), Santoprene™ thermoplastic elastomer (Advanced Elastomer Systems, Akron, Ohio), and Keltan™ EPDM (DSM Elastomers Americas, Addis, La.).

A curing agent is preferably blended with the curable elastomer to facilitate cure. Examples of useful curing agents include imidazolines, diamines, internal salts of diamines, thioureas, and polyphenol curing agents as discussed in U.S. Pat. No. 4,287,322 (Worm), incorporated herein by reference. Such agents are particularly useful for epichlorohydrin compositions. Other examples, particularly useful in the curing of nitrile rubber-containing compositions, include peroxide compounds and sulfur-containing compounds.

In the case of curable fluoroelastomers, examples of useful curing agents include polyols in combination with organo-onium salts (e.g., organo-ammonium, organo-phosphonium, and organo-sulfonium salts). Specific examples are described, e.g., in Fukushi, U.S. Pat. No. 5,658,671, "Fluoroelastomer Coating Composition," hereby incorporated by reference. Diamines and peroxides are also useful.

The multi-layer article may contain additional polymer layers as well. Examples of suitable polymer layers include non-fluorinated polymers such as polyamides, polyimides, polyurethanes, polyolefins, polystyrenes, polyesters, polycarbonates, polyketones, polyureas, polyacrylates, and polymethylmethacrylates. Adhesion between a fluorothermoplastic layer, a fluoroelastomer layer and an elastomer layer can be improved by step curing the three extruded layers in which the elastomer layer is an outside layer, the fluoroplastic layer is a middle layer and the fluoroelastomer layer is an inside layer.

A particularly useful construction for fuel applications features a relatively thin layer of the fluoroplastic that acts as a barrier layer bonded on one face to a relatively thick layer of non-fluorinated polymer that acts as a coverstock, and on the opposite face to a relatively thin elastomer layer (e.g., a fluoroelastomer or a non-fluorinated elastomer) that performs a sealing function. The coverstock provides the article with structural integrity. To further enhance structural integrity, reinforcing aids such as fibers, mesh, and/or a wire screen may be incorporated in the multi-layer article, e.g., as separate layers or as part of an existing layer.

Any or all of the individual layers of the multi-layer article may further include one or more additives. Examples of useful additives include pigments, plasticizers, tackifiers, fillers, electrically conductive materials (e.g., of the type described in U.S. Pat. No. 5,552,199), electrically insulating materials, stabilizers, antioxidants, lubricants, processing aids, impact modifiers, viscosity modifiers, and combinations thereof. For example, in the case of the multi-layer article for fuel applications described above, it is often useful for the innermost layer of the construction to be electrically conductive.

In some cases, it may be desirable to further enhance bond strength between individual layers of the multi-layer article. For example, the article may be subjected to additional heat, pressure, or both, following cure.

Another way of increasing the bond strength between the layers is to treat the surface of one or more of the layers prior to forming the multi-layered articles. Such surface treatments may consist of a solution treatment using a solvent. If the solvent contains a base, e.g., 1,8-diaza[5.4.0]bicyclo undec-7-ene (DBU), treatment of the fluoropolymer will result in some degree of dehydrofluorination. Such dehydrofluorination may be beneficial to promote adhesion to subsequently applied materials. This is particularly true when the subsequently applied material contains any agent that is reactive to sites of unsaturation.

Other examples of surface treatments include charged atmosphere treatments such as corona discharge treatment or plasma treatment. Electron beam treatment is also useful.

Interlayer adhesion may also be enhanced using an agent such as an aliphatic di- or polyamine. The amine can be of any molecular weight that, when used, will result in an improvement in the adhesive bond strength between the layers of the multi-layer article. A particularly useful polyamine is polyallylamine having a molecular weight greater than about 1,000, as measured by gel permeation chromatography. An example of a useful commercially available polyamine is polyallyl amine having a molecular weight of about 3,000 available from Nitto Boseki Co., Ltd.

The amine may be incorporated into one or more of the layers of the multi-layer article prior to forming the article using conventional means such as melt-mixing. Alternatively, the amine may be applied to a surface of one or more of the layers using conventional coating methods such as spray coating, curtain coating, immersion coating, dip coating, and the like.

The invention will now be described further by way of the following examples.

EXAMPLES

The following examples describe the preparation of various multi-layer articles featuring a fluoroplastic layer bonded to an elastomer layer. In each example, the elastomer was a fluoroelastomer prepared by combining the following ingredients: 100 parts Dyneon FE-5830Q fluoroelastomer (commercially available from Dyneon LLC, St. Paul, Minn.); 13 parts N-762 carbon black (commercially available from Cabot Corp., Alpharetta, Ga.); 6 parts calcium hydroxide HP (commercially available from C. P. Hall, Chicago, Ill.); 3 parts magnesium oxide (commercially available from Morton International, Danvers, Mass., under the designation "Elastomag™ 170"); and 6 parts calcium oxide HP (commercially available from C. P. Hall, Danvers, Mass.). The composition was extruded to form the fluoroelastomer in the shape of a tube having an outer diameter of 12 mm and a wall thickness of 0.33 mm.

Example 1

A cross-head die equipped with a polytetrafluoroethylene (PTFE) sleeve was used to coat a molten fluoroplastic composition onto the surface of the fluoroelastomer tube. The fluoroplastic was a TFE-HFP-VDF terpolymer featuring 76 wt. % TFE, 11 wt. % HFP, and 13 wt. % VDF. The fluoroplastic had a melt flow index of 7 and a melting point of 233° C. The PTFE sleeve prevented heating of the fluoroelastomer surface prior to application of the fluoroplastic.

Following application of the fluoroplastic composition, the resulting multi-layer article was passed through a 15.2 cm long tubular heater set at 220° C. (the surface temperature of the fluoroplastic was 140° C.) to heat the article prior to cooling. Once cooled, the article was cut into smaller samples that were then placed on a steel mandrel and thermally cured at a temperature of 160° C. and a pressure of 0.4 MPa for 60 minutes using steam in an autoclave. Following cure, the samples were removed from the autoclave and cooled to room temperature.

The peel adhesion of the cured samples was evaluated by making a cut in each sample to separate a 7 mm wide strip of the fluoroplastic outer layer from the fluoroelastomer core in order to provide a tab for adhesion testing. The thickness of the fluoroplastic layer was 0.3 mm. An Instron® Model 1125 tester, available from Instron Corp., set at a 100 mm/min. crosshead speed was used as the test device. Peel strength between the fluoroplastic and fluoroelastomer layers was measured in accordance with ASTM D 1876 (T-Peel Test) with the exception that the peel angle was 90 degrees. The results of two samples were averaged. The average value is reported in Table 1.

Example 2

The procedure of Example 1 was followed except that the fluoroplastic was a TFE-HFP-VDF terpolymer commercially available from Dyneon LLC, St. Paul, Minn. under the designation "THV-500". The results of the peel adhesion test are reported in Table 1.

Comparative Example C-1

The procedure of Example 1 was followed except that the PTFE sleeve was not used. The results of the peel adhesion test are reported in Table 1.

Comparative Example C-2

The procedure of Example 1 was followed except that the heater was not used. The results of the peel adhesion test are reported in Table 1.

Comparative Example C-3

The procedure of Example 1 was followed except that neither the PTFE sleeve nor the heater was used. The results of the peel adhesion test are reported in Table 1.

TABLE 1

| Example Number | Sleeve | Heater | Peel Strength (N/cm) |
| --- | --- | --- | --- |
| 1 | Yes | Yes | 25.6 |
| 2 | Yes | Yes | 25.8 |
| C-1 | No | Yes | 14.1 |
| C-2 | Yes | No | 8.0 |
| C-3 | No | No | 4.9 |

The results shown in Table 1 demonstrate that thermally insulating the curable elastomer layer prior to application of the fluoroplastic composition, in combination with heating the fluoroplastic layer following application of the fluoroplastic composition to the curable elastomer layer, results in multi-layer articles with enhanced interlayer adhesion upon cure, even in the absence of separate adhesion-promoting measures.

In another set of examples, a multi-layer tube includes an inner layer of a fluoroelastomer, an intermediate layer of a fluorothermoplastic barrier layer, and an outer layer of an elastomer or rubber or thermoplastic elastomer.

Example 3

In Example 3, a cross-head die with a PTFE sleeve was used to coat THV-500 onto an extruded fluoroelastomer tube, which has an outer diameter of 16 mm with 1 mm thick wall. The sleeve prevented heating of the surface of the fluoroelastomer. The fluoroelastomer compound formulation for making the tube is shown in Table 2.

TABLE 2

| Ingredients (supplier) | FKM comp phr* |
|---|---|
| Dyneon FE-5830Q (FKM) (Dyneon) | 100 |
| N-990 (carbon black) (Cancarb) | 12 |
| Vulcan XC072 (conductive carbon black) (Cabot) | 10 |
| Calcium hydroxide HP (C.P. Hall) | 5 |
| Elastomag ™ 170 (magnesium oxide) (Morton International) | 3 |
| Calcium oxide HP (C.P. Hall) | 6 |
| Dibutyl sebacate (DBS) (Aldrich Chemical) | 5 |

TABLE 2-continued

| Ingredients (supplier) | FKM comp phr* |
|---|---|

*All amounts referred to are in parts per 100 parts rubber by weight, abbreviated "phr."

Following application of the fluoroplastic composition, the resulting multi-layer article was passed through a 15.2 cm long tubular heater set at 220° C. (the surface temperature of the fluoroplastic was 140° C.) to heat the article prior to cooling. The fluoroplastic coated fluoroelastomer tube was cooled and then the tube was covered with ethylene-epichlorohydrin rubber (ECO) rubber, which had a wall thickness of 2 mm. The article was cut into curing samples. The samples were cured at 143° C. and 0.28 MPa for 30 minutes by steam in an autoclave with a steel mandrel and then cured at 154° C. and 0.41 MPa for 30 minute. Following the cure, the samples were removed from the autoclave and cooled to room temperature.

The peel adhesion of the cured samples was evaluated by making a cut to separate a 25.4 mm wide strip of the fluoroplastic layer from the fluoroelastomer and ECO layer from the fluoroplastic in order to provide tabs to test the adhesion between the layers via a peel test. The thickness of fluoroplastic layer was 0.3 mm. An Instron® Model 1125 tester, available from Instron Corp., set at a 100 mm/mm crosshead speed was used as the test device. Peel strength or adhesion was measured on the two strips in accordance with ASTM D 1876 (T-Peel Test). The results of the two samples were averaged the test results are summarized in Table 3.

Example 4

In Example 4, the sample was prepared and tested as in Example 3 except that the first curing condition was 146° C. and 0.3 MPa for 30 minutes. The test result is summarized in Table 3.

Comparative Example C-4

In Comparative Example C-1, the sample was prepared and tested as in Example 3 except that the sample was cured at 143° C. and 0.28 MPa for 60 minutes without applying the second curing condition. The test result is summarized in Table 3.

Comparative Example C-5

In Comparative Example C-5, the sample was prepared and tested as in Example 3 except that the sample was cured at 154° C. and 0.41 MPa for 30 minutes without applying the second curing condition. The test result is summarized in Table 3.

TABLE 3

| | Curing Condition | | | | | | Peel strength | |
|---|---|---|---|---|---|---|---|---|
| | 1$^{st}$ cure | | | 2$^{nd}$ cure | | | (N/cm) | |
| Example | Pressure (MPA) | Temp. (° C.) | Time (min) | Pressure (MPA) | Temp. (° C.) | Time (min) | FKM/THV | THV/ECO |
| 3 | 0.28 | 143 | 30 | 0.41 | 154 | 30 | 42 | 38 |
| 4 | 0.30 | 146 | 30 | 0.41 | 154 | 30 | 38 | 33 |
| C-4 | 0.28 | 143 | 60 | — | — | — | 30 | 0.5 |
| C-5 | 0.41 | 154 | 30 | — | — | — | 0.3 | 40 |

The data in Table 3 demonstrate that a step curing process provides substantially improved peel strength of both FKM/THV layer and THV/ECO layer in an article compared to the peel strength in an article prepared without step curing.

A number of embodiments of the invention have been described. Nevertheless, it will be understood that various modifications may be made without departing from the spirit and scope of the invention. Accordingly, other embodiments are within the scope of the following claims.

For example, although the process shown in FIG. 1 illustrates the preparation of a multi-layer article in the form of a tube, other shapes may be prepared as well. Also, while FIG. 1 illustrates the use of extruders to prepare the curable elastomer layer and fluoroplastic layers, other polymer processing techniques may be used. For example, the curable elastomer and fluoroplastic compositions can be prepared in the form of sheets and then laminated together, so long as measures are taken to thermally insulate the curable elastomer prior to application of the fluoroplastic. In addition, although FIG. 1 illustrates the use of a tubular A heater for radiantly heating the fluoroplastic layer, other heating methods could be used. For example, in the case of fluoroplastic layers containing, e.g., metal particles, induction heating could be used.

What is claimed is:

1. A process for preparing a multi-layer article comprising:
   (a) providing a precursor article comprising a curable elastomer layer, said article having an exposed surface available for application of a fluoroplastic layer;
   (b) thermally insulating said curable elastomer layer prior to application of said fluoroplastic layer;
   (c) applying a fluoroplastic composition comprising interpolymerized vinylidene fluoride units onto said exposed surface of said precursor article to form a fluoroplastic layer;

(d) heating said fluoroplastic layer; and (e) curing said curable elastomer layer to form a multi-layer article comprising a fluoroplastic layer and an elastomer layer.

2. A process according to claim 1 comprising applying said fluoroplastic composition in molten form.

3. A process according to claim 2 comprising applying said fluoroplastic composition by extrusion coating said fluoroplastic composition through a crosshead die onto said exposed surface of said precursor article.

4. A process according to claim 3 wherein said die comprises a die body that receives said fluoroplastic composition, an upstream opening for receiving said precursor article, a downstream opening, and a sleeve located at least partially within said upstream opening of said die that receives said precursor article and thermally insulates said curable elastomer layer prior to application of said fluoroplastic composition.

5. A process according to claim 1 further comprising cooling said multi-layer article subsequent to heating said fluoroplastic layer.

6. A process according to claim 1 comprising thermally curing said curable elastomer layer.

7. A process according to claim 1 comprising curing said curable elastomer layer subsequent to heating said fluoroplastic layer.

8. A process according to claim 1 comprising providing said precursor article by extruding a curable elastomer composition through a die to form said precursor article.

9. A process according to claim 1 wherein said curable elastomer layer has an exposed surface available for application of said fluoroplastic composition and said fluoroplastic composition is applied directly to said exposed surface of said curable elastomer layer.

10. A process according to claim 1 wherein said elastomer comprises a fluoroelastomer.

11. A process according to claim 1 wherein said elastomer comprises a non-fluorinated elastomer.

12. A process according to claim 1 wherein said fluoroplastic has a melting temperature ranging from about 100 to about 330° C.

13. A process according to claim 1 wherein said fluoroplastic has a melting temperature ranging from about 150 to about 270° C.

14. A process according to claim 1 wherein said fluoroplastic comprises interpolymerized units derived from tetrafluoroethylene, vinylidene fluoride, and a monomer selected from the group consisting of hexafluoropropylene, perfluorinated alkoxy vinyl ethers, perfluorinated alkyl vinyl ethers, olefins, and combinations thereof.

15. A process according to claim 14 wherein the amount of said vinylidene fluoride units is at least 3% by weight but less than 20% by weight.

16. A process according to claim 14 wherein the amount of said vinylidene fluoride units is between 10 and 15% by weight.

17. A process according to claim 1 further comprising bonding a polymer layer to said fluoroplastic layer to form a multi-layer article comprising said fluoroplastic layer interposed between said elastomer layer and said polymer layer.

18. A process according to claim 17 comprising bonding said polymer layer directly to said fluoroplastic layer.

19. A process according to claim 17 wherein said polymer comprises an elastomer.

20. A process according to claim 19 wherein said elastomer comprises a nitrite rubber.

21. A process according to claim 1 further comprising placing a polymer layer on said fluoroplastic layer prior to curing.

22. A process according to claim 21 wherein curing includes a first stage at a first temperature and a second stage at a second temperature, the first temperature being lower than the second temperature.

23. A process according to claim 22 wherein said polymer comprises an elastomer.

24. A process according to claim 1 wherein said multi-layer article is in the form of a tube.

25. A process according to claim 1 wherein the adhesion between said fluoroplastic layer and said elastomer layer is at least 15 N/cm.

26. A process according to claim 22 wherein the adhesion between said fluoroplastic layer and said polymer layer is at least 15 N/cm.

27. A process according to claim 1 further comprising cooling said curable elastomer layer prior to application of said fluoroplastic composition.

28. A process for preparing a multi-layer article comprising:

(a) providing a precursor article comprising a curable elastomer layer, said curable elastomer layer having an exposed surface available for application of a fluoroplastic layer;

(b) extrusion coating a molten fluoroplastic composition comprising interpolymerized vinylidene fluoride units through a crosshead die onto said exposed surface of said curable elastomer layer to form a fluoroplastic layer, said die comprising a die body that receives said molten fluoroplastic composition, an upstream opening for receiving said precursor article, a downstream opening, and a sleeve located at least partially within said upstream opening of said die that receives said precursor article and thermally insulates said curable elastomer layer prior to application of said fluoroplastic composition;

(c) heating said fluoroplastic layer; and (d) thermally curing said curable elastomer layer subsequent to heating said fluoroplastic layer to form a multi-layer article comprising a fluoroplastic layer and an elastomer layer.

29. A process for preparing a multi-layer article comprising:

(a) providing a precursor article comprising a curable elastomer layer, said curable elastomer layer having an exposed surface available for application of a fluoroplastic layer;

(b) extrusion coating a molten fluoroplastic composition comprising interpolymerized vinylidene fluoride units through a crosshead die onto said exposed surface of said curable elastomer layer to form a fluoroplastic layer, said die comprising a die body that receives said molten fluoroplastic composition, an upstream opening for receiving said precursor article, a downstream opening, and a sleeve located at least partially within said upstream opening of said die that receives said precursor article and thermally insulates said curable elastomer layer prior to application of said fluoroplastic composition;

(c) placing a polymer layer on said fluoroplastic layer; and (d) thermally curing said elastomer layer and polymer layer in a first stage at a first temperature and a second stage at a second temperature, the first temperature being lower than the second temperature, to form a multi-layer article comprising a fluoroplastic layer, an elastomer layer, and a polymer layer.

* * * * *

UNITED STATES PATENT AND TRADEMARK OFFICE
CERTIFICATE OF CORRECTION

PATENT NO. : 6,773,755 B2
DATED : August 10, 2004
INVENTOR(S) : Fukushi, Tatsuo

It is certified that error appears in the above-identified patent and that said Letters Patent is hereby corrected as shown below:

<u>Column 8,</u>
Line 53, "tubular A heater" should be shown as -- tubular heater --

Signed and Sealed this

Thirtieth Day of November, 2004

JON W. DUDAS
*Director of the United States Patent and Trademark Office*